Dec. 6, 1927.
F. J. CHAMPLIN
1,651,869
SYSTEM OF ELECTRIC DISTRIBUTION
Filed Feb. 24, 1927
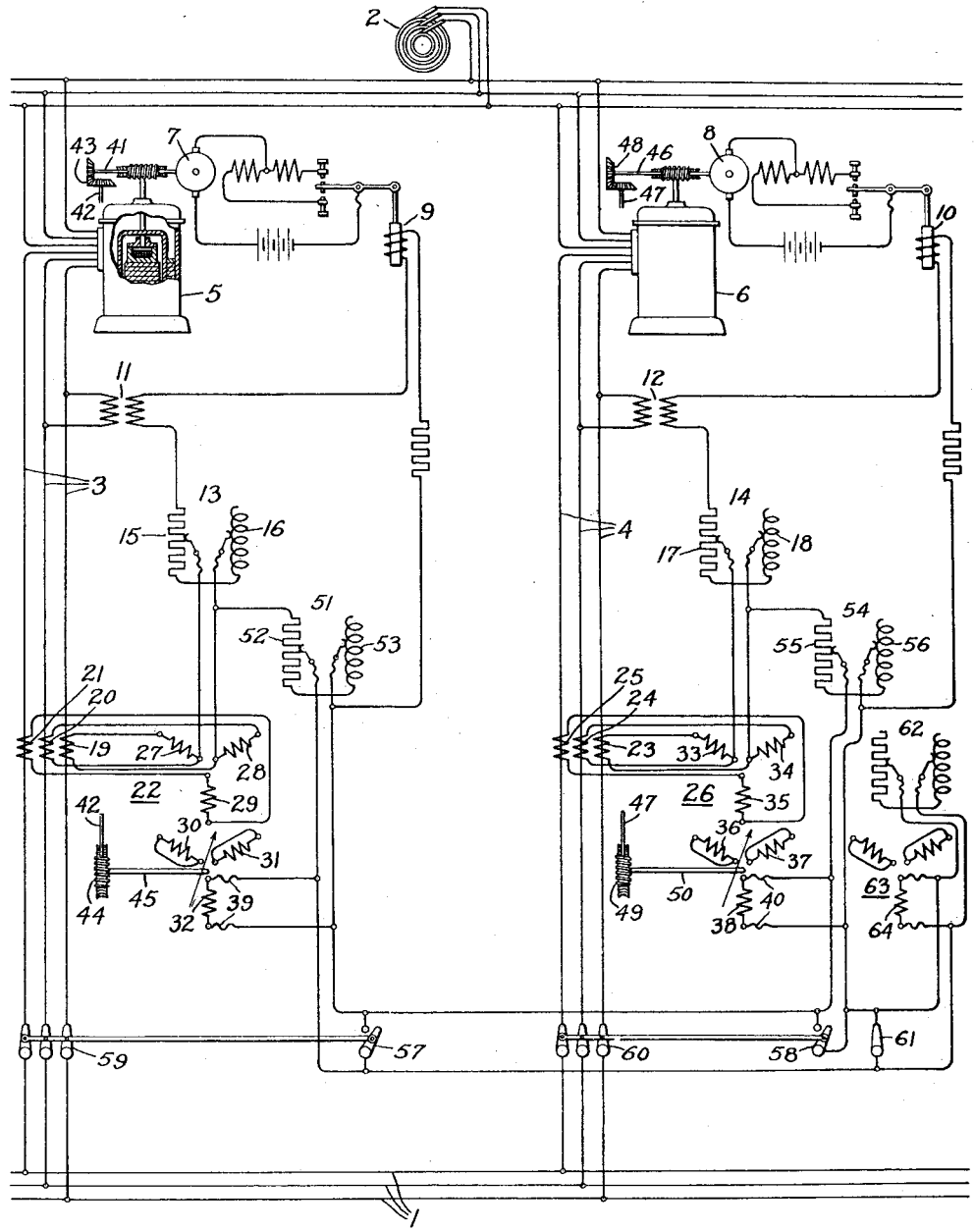
Inventor:
Franklin J. Champlin,
by
His Attorney.

Patented Dec. 6, 1927.

1,651,869

UNITED STATES PATENT OFFICE.

FRANKLIN J. CHAMPLIN, OF DALTON, MASSACHUSETTS, ASSIGNOR TO GENERAL ELECTRIC COMPANY, A CORPORATION OF NEW YORK.

SYSTEM OF ELECTRIC DISTRIBUTION.

Application filed February 24, 1927. Serial No. 170,648.

My invention relates to systems of electric distribution and particularly to systems comprising a plurality of parallel feeders interconnecting a common source and a common distribution circuit.

In my application Serial No. 41,595, filed July 6, 1925, and assigned to the same assignee as this application, a regulating arrangement is disclosed and claimed for automatically controlling voltage modifying means such as induction regulators in parallel feeders between a common source and a common distribution circuit so as to maintain a predetermined voltage at a predetermined point in the distribution circuit. That arrangement requires only one current transformer in each feeder of a single phase system in contradistinction to the arrangement of a plurality of transformers shown in Letters Patent 1,373,923, granted April 5, 1921, to Magnus Unger.

In my prior arrangement the single transformer feeds into an insulating transformer which causes a current to flow in a corrective impedance placed in the circuit of the coil of a contact-making voltmeter upon the occurrence of a circulating current, and provides a system for eliminating circulating currents without mechanical interconnection and permits the number of feeders in service to be varied without changing the adjustment of any of the apparatus.

In the case of single phase regulators for parallel feeder circuits the circulating current is always substantially in quadrature with the feeder voltage, so that the potential drop across the corrective impedance in the circuit of the voltage responsive device has an inphase relation to the potential transformer secondary voltage. This, however, is not the case in feeders operated with polyphase regulators and, unless the circuit between the regulators is quite long, so that there is considerable reactance introduced, it is difficult to obtain stable and successful operation. The present arrangement is an improvement of the arrangement shown in the aforementioned application for systems employing polyphase regulators.

An object of my invention is to provide a new and improved arrangement for automatically controlling the regulation of polyphase voltage modifying means, such as polyphase induction regulators in a polyphase system of parallel feeders interconnecting a common source and a common distribution circuit whereby said voltage modifying means may be operated without mechanical interconnection to prevent circulating currents.

My invention will be better understood from the following description taken in connection with the accompanying drawing, and its scope will be pointed out in the appended claims.

Referring to the drawing, which shows diagrammatically a three-phase system of electric distribution embodying my invention, 1 represents a distribution circuit supplied from a suitable source of current 2 by means of a plurality of feeders. I have shown only two feeders 3 and 4 in the drawing, but it will be apparent that my invention may be applied to any number of parallel feeders.

In order to maintain the voltage constant at a predetermined point on the distribution circuit, voltage modifying means of any suitable type are connected in each feeder whereby the voltage thereof may be varied. As shown in the drawing, the voltage modifying means are three-phase induction regulators 5 and 6 connected in the feeders 3 and 4, respectively. Each regulator is provided with a suitable actuating means therefor whereby the movable member thereof may be moved in either direction. As shown, the regulator 5 is actuated by a reversible motor 7 and the regulator 6 is actuated by a reversible motor 8. The circuits of the motors 7 and 8 are controlled respectively by voltage responsive devices such as the contact-making voltmeters 9 and 10. The coil of the voltmeter 9 is connected to the secondary of a potential transformer 11, the primary of which is connected across one phase of the feeder 3, and the coil of the voltmeter 10 is connected to the secondary of a potential transformer 12 the primary of which is connected across one phase of the feeder 4.

In order that the regulators 5 and 6 may be automatically adjusted in accordance with variations in the voltage at some other point than where the respective transformers are connected, suitable line drop compensators 13 and 14 examples of which are well known in the art are provided respectively in the operating coil circuits of the voltmeters 9 and 10. As shown, the line drop compensator 13 comprises a resistor 15 and a reactance 16 connected in series with the coil of the voltmeter, and the line drop compensator 14 comprises a resistor 17 and a reactance 18 connected in series with the coil of the voltmeter 10. Current transformers 19, 20 and 21 are connected in series relation with the feeder 3 and instead of being connected to energize an insulating transformer, as shown in the arrangement disclosed in my application Serial No. 41,595, previously mentioned, the transformers are arranged to energize a transforming device 22 referred to as a "phase shifter". The phase shifter is utilized to maintain a predetermined phase relation between the feeder circulating current and the secondary voltage of the potential transformer of the corresponding feeder so as to obtain the proper corrective voltage drop in the operating coil circuit of voltmeter 9. It will be obvious that this phase relation may be any value depending upon the nature of the corrective impedance, referred to hereinafter, which is connected in series with the voltmeter coil. If, for example, the predominating component of the impedance is a resistance component, it would be desirable to have the phase displacement approach zero, but, if the predominating component of the impedance is a reactance component, it is desirable to have the phase displacement approach 90 degrees. Preferably, it is desirable to have a quadrature phase displacement between the circulating current and the secondary voltage of the potential transformed in order to obtain minimum losses, and the corrective impedance is adjusted to correspond to this condition. In a similar manner, current transformers 23, 24 and 25 are connected in series relation with feeder 4 and are connected to energize a phase shifter 26.

The phase shifters in structure and essential details take the form of the well known polyphase induction regulator such as is shown in Letters Patent No. 571,467, granted to A. H. Armstrong, November 17, 1896, and comprise relatively movable primary and secondary windings. For purposes of illustration, each phase shifter is shown as provided with a three-phase primary winding disposed on the usual form of stationary magnetic member or stator and arranged similarly to the series winding of the well known induction regulator, and a secondary winding comprising a plurality of windings arranged on a rotatable member or rotor in the same manner as the shunt winding of the well known induction regulator. It is to be noted, however, that either member may be made the rotatable or movable member. One of the secondary windings is connected to a corrective impedance in the voltmeter coil circuit and the remainder of said windings are shortcircuited on themselves. The object of the shortcircuited winding or windings is to equalize the losses and the reactance of the phase shifter in its various positions.

Phase shifter 22 is provided with a three-phase primary winding comprising windings 27, 28 and 29 arranged on the stator member and connected to be energized by current transformers 19, 20 and 21 respectively. The secondary or rotatable member is designed essentially for single phase operation and is provided with a winding 32 which is connected to the coil circuit of the voltmeter 9, and a shortcircuited winding, or windings, which, for purposes of illustration, is shown as two windings 30 and 31 displaced electrically 120 degrees respectively with respect to winding 32 and shortcircuited on themselves. It is feasible to operate the phase shifter with one shortcircuited winding placed at right angles to the winding which is connected to the voltmeter coil circuit.

Similarly, phase shifter 26 is provided with a primary member comprising windings 33, 34 and 35 and a secondary rotatable member comprising windings 36, 37 and 38. The primary windings 33, 34 and 35 are connected to be energized by the current transformers 23, 24 and 25 respectively. The secondary windings 36 and 37 of the phase shifter 26 are shortcircuited on themselves. The windings 32 and 38 of the respective phase shifters are connected through suitable flexible connections 39 and 40 to the operating circuit of voltage responsive devices 9 and 10 respectively.

The rotatable member of each phase shifter is arranged to be rotated in synchronism with the rotatable member of its associated regulator. For purposes of illustration, a suitable mechanical arrangement is shown in connection with each regulator. Regulator 5 is provided with a shaft extension 41 which rotates with the regulator rotor member and is connected to rotate a shaft 42 through suitable gearing 43. This shaft 42 in turn is arranged to rotate the rotatable member of phase shifter 22 through suitable gearing 44 and shaft extension 45. Similarly, regulator 6 is provided with a shaft extension 46 which rotates with the regulator rotatable member and is connected to rotate a shaft 47 through suitable gearing 48. This shaft in turn is arranged to rotate the rotatable member of phase shifter 26 through suitable gearing 49 and a shaft extension 50. The secondary windings of current transformers 19 and 20 are connected by means of suitable adjustable switching means to the resistor 15 and reactance 16 respectively so that a current proportional to the feeder current flows through a portion of the resistor and the reactance. This current produces a potential drop across the portions of the resistor and the reactance through which it flows, which causes a variation in the potential drop in the voltmeter circuit as the feeder current varies so that the voltage is maintained constant at the desired point on the distribution circuit. In a similar manner, current transformers 23 and 24 in feeder 4 are connected to the resistor 17 and reactance 18 so as to vary the potential drop in the circuit of the coil of the voltmeter 10 as the current in feeder 4 varies.

In order to control the voltmeters 9 and 10 so that regulators 5 and 6 are operated to eliminate any circulating current that flows around the loop circuit formed by the parallel feeder, I provide a suitable impedance in series with each voltmeter circuit. An impedance 51 comprising a resistor 52 and a reactance 53 is connected in series with the coil of voltmeter 9, and an impedance 54 comprising a resistor 55 and a reactance 56 is connected in series with the coil of voltmeter 10. The impedances 51 and 54 are connected by means of suitable adjustable switching means directly across the secondary windings 32 and 38 of phase shifters 22 and 26 respectively. These secondary windings 32 and 38 also are connected together for circulating currents. Therefore, so long as the currents in the two feeders are equal in phase and magnitude, no current from either of the secondary windings of the phase shifters flows through the impedances 51 and 54.

Suitable switching means 57 and 58 are provided for shortcircuiting the impedances 51 and 54 respectively. These switches may be interlocked respectively with the main feeder switches 59 and 60 in any suitable manner so that when a feeder switch is opened the respective short circuiting switch is closed and vice versa.

In order to indicate how my invention may be applied to systems of electric distribution having more than two parallel feeders, I have shown for a third feeder a shortcircuiting switch 61, an impedance 62, and the rotor member of a phase shifter 63 comprising a winding 64. The winding 64 is connected to the corresponding windings 32 and 38 of phase shifters 22 and 26 for circulating currents.

The operation of the illustrated embodiment of my invention will be understood from the following description. It will be assumed that the feeders 3 and 4 are the only ones that have their main switches closed. Therefore, the shortcircuiting switch 61 of the third feeder is closed and the shortcircuiting switches 57 and 58 are open.

It will be observed that as the current through each feeder increases, the drop across the portion of the associated line drop compensator which is in circuit with the secondary of the associated current transformers varies and modifies in a manner well known in the art, the potential drop in the associated voltmeter circuit so that the associated regulator is adjusted to maintain a constant voltage at a predetermined point on the distribution circuit.

So long as the voltages of the two feeders are equal, the currents in the two feeders are equal, and no current from the windings 32 and 38 of the phase shifters 22 and 26 flows through the impedances 51 and 54 because the secondary currents of the phase shifters are equal and therefore merely circulate around through these secondary windings. When, however, the voltage of one of the feeders exceeds the voltage of the other, a circulating current flows through the feeders and the secondary currents of the windings 32 and 38 are no longer equal. The difference between the two secondary currents flows through the impedances 51 and 54 and produces a potential drop therein that so modifies the voltages impressed upon the voltmeters 9 and 10 that they cause the regulators 5 and 6 to be operated by means of motors 7 and 8 in a manner to eliminate the circulating current.

In accordance with my invention the rotor member of phase shifter 22 will be rotated in accordance with the rotation of the rotor member of regulator 5 through the agency of shaft 41, gears 43, shaft 42, gears 44 and shaft 45 to keep the phase relation between the circulating current vector and the secondary voltage of potential transformer 11 such that the potential drop across the corrective impedance 51 is substantially in phase with the secondary voltage of potential transformer 11. Similarly, the rotor member of phase shifter 26 will be rotated in accordance with the rotation of the rotor member of regulator 6 through the agency of shaft 46, gears 48, shaft 47, gears 49 and shaft 50 to keep the phase relation between the circulating current vector and the secondary voltage of potential transformer 12 such that the potential drop obtained across the corrective impedance 54 is approximately in phase with the secondary voltage of transformer 12.

It will be observed that the connections of the secondary windings of each phase shifter are arranged so that when a circulating current flows through the feeders, the difference between the secondary currents of the windings 32 and 38 flows through the impedances 51 and 54 in opposite directions. The windings 32 and 38 are so connected to the impedances 51 and 54 that the drop produced across the impedance associated with the feeder having the higher voltage, which is the one through which the circulating current flows from the source to the distribution circuit 1, increases the potential impressed on the associated voltmeter so that the regulator which is controlled thereby is operated to reduce the voltage of the feeder, and the drop produced across the impedance associated with the feeder having the lower voltage, which is the one through which the circulating current returns from the distribution circuit to the source, decreases the potential impressed upon its associated voltmeter coil circuit so that the regulator, which is controlled thereby, is operated to increase the voltage of the feeder. For example, if the voltage of the feeder 4 exceeds the voltage of feeder 3 so that a circulating current flows through the feeders in a clockwise direction, a potential drop is produced across the impedance 54 in such a direction that the regulator 6 is operated in a direction to reduce the voltage of feeder 4 and a potential drop is produced across the impedance 51 which causes the regulator 5 to be operated so as to increase the voltage of the feeder 3. It will be observed, therefore, that the regulators are operated automatically, to eliminate the circulating current.

It will be evident that the operation is the same when more than two feeders are in use. If the voltage of one of the feeders exceeds the voltages of the other two, the circulating current then flows through the feeders, causing a current to flow through each of the impedances. For example, let it be assumed that the feeder with which the phase shifter 63 and impedance 62 are associated is in service so that the shortcircuiting switch 61 is open and that the voltage of the feeder 4 is increased relatively to the voltages of the other two feeders so that a circulating current flows to the distribution circuit 1 through the feeder 4 and returns through the other two feeders in parallel. Under these conditions, a portion of the secondary current of the transformers 23, 24 and 25 divides and flows through two parallel circuits. One of these circuits comprises the impedance 54 which is connected directly in the circuit of the secondaries of the transformers just mentioned. The other circuit comprises the two impedances 51 and 62 in series. It will be noted, however, that the current through the impedance 54 flows through it in one direction and that the current through the impedances 51 and 62 flows through them in the opposite direction. Therefore, the potentials impressed upon the voltmeter coil circuits are so modified that the regulators are actuated to eliminate circulating current.

While I have shown and described my invention as applied to a particular system and as embodying various devices diagrammatically indicated, changes and modifications will occur to those skilled in the art without departing from my invention, and I, therefore, aim in the appended claims to cover all such changes and modifications as fall within the true spirit and scope of my invention.

What I caim as new and desire to secure by Letters Patent of the United States, is:—

1. In a polyphase system of electric distribution, a source of alternating current, a plurality of feeders connecting said distribution circuit and said source, polyphase voltage modifying means interposed in each of said feeders for controlling the voltage impressed upon said distribution circuit, means associated with each feeder and connected to be responsive to the voltage thereof for controlling the associated voltage modifying means, and means for each feeder responsive to a circulating current flowing between said feeder circuits and connected to the circuit of said voltage responsive means for maintaining the phase relation between any circulating current occurring in the circuit of said voltage responsive means and the feeder voltage impressed thereon substantially at a predetermined value for modifying the operation of said voltage responsive means to eliminate circulating currents between said feeders.

2. In a polyphase system of electric distribution, a distribution circuit, a source of alternating current, a plurality of feeders connecting said distribution circuit and said source, polyphase voltage modifying means interposed in each of said feeders for controlling the voltage impressed upon said distribution circuit, means associated with each feeder and connected to be responsive to the voltage thereof for controlling the associated voltage modifying means, and transforming means in each feeder for interconnecting the associated feeder and the circuit of the associated voltage responsive device for maintaining a substantially quadrature phase relation between any circulating current occurring in the circuit of said voltage responsive means and the feeder voltage impressed thereon to modify the operation of said voltage responsive means to eliminate circulating currents between said feeders.

3. In a polyphase system of electric distribution, a source of alternating current, a distribution circuit, a plurality of parallel feeders connecting said source to said distribution circuit, polyphase voltage modifying means associated with each feeder for controlling the voltage impressed on said distribution circuit, a voltage responsive device associated with each feeder for controlling the associated voltage modifying means, a circuit for each voltage responsive device, an impedance in said circuit of said voltage responsive device connected to be responsive to a circulating current flowing between said feeder circuits for automatically varying the voltage impressed upon the circuit of said voltage responsive device, and means for maintaining the phase relation between the circulating current flowing through said impedance and the voltage of said feeder impressed upon the circuit of said voltage responsive device substantially at a predetermined valve.

4. In a polyphase system of electric distribution, a source of alternating current, a distribution circuit, a plurality of parallel feeders connecting said source to said distribution circuit, polyphase voltage modifying means associated with each feeder for controlling the voltage impressed on said distribution circuit, a voltage responsive device associated with each feeder for controlling the associated voltage modifying means, a circuit for each voltage responsive device, an impedance in the circuit of said voltage responsive device responsive to a circulating current flowing between said feeder circuits for automatically varying the voltage impressed upon said voltage modifying means, transforming means for maintaining substantially a quadrature phase displacement between the circulating current in the circuit of said voltage responsive device and the voltage of the associated feeder impressed upon the circuit of said voltage responsive device.

5. In a polyphase system of electric distribution, a source of alternating current, a distribution circuit, a plurality of parallel feeders connecting said source to said distribution circuit, polyphase voltage modifying means associated with each feeder for controlling the voltage impressed on said distribution circuit, a voltage responsive device for each voltage modifying means, a circuit for each voltage responsive device, means for impressing a voltage on the circuit of each voltage responsive device in accordance with the voltage of its associated feeder, an impedance connected in the circuit of each voltage responsive device, and means for introducing a current in said impedance corresponding to a circulating current in said feeders and for maintaining a substantially fixed phase relation between the potential drop across said impedance due to said circulating current and the feeder voltage impressed on the circuit of the associated voltage responsive device.

6. In a polyphase system of electric distribution, a source of alternating current, a distribution circuit, a plurality of parallel feeders connecting said source to said distribution circuit, a polyphase induction regulator associated with each feeder for controlling the voltage impressed on said distribution circuit, a contact-making voltmeter comprising an operating coil circuit associated with each feeder, a potential transformer associated with each feeder for impressing a voltage on the coil circuit of each voltmeter in accordance with the voltage of its associated feeder, an impedance in the circuit of each of said voltmeter coil circuits, and transforming means for introducing a current in said impedance corresponding to a circulating current in said feeders and for maintaining a substantially in-phase relation between the potential drop across said impedance due to said circulating current and the feeder voltage impressed on the coil circuit of the associated voltmeter.

7. In a polyphase system of electric distribution, a source of alternating current, a distribution circuit, a plurality of parallel feeders connecting said source to said distribution circuit, polyphase voltage modifying means associated with each feeder for controlling the voltage impressed on said distribution circuit, a voltage responsive device associated with each feeder for controlling the associated voltage modifying means, a circuit for each voltage responsive device, transforming means associated with each feeder and connected so that the current therein varies with the current in the associated feeder, each transforming means comprising relatively movable primary and secondary windings, and an impedance connected directly across a secondary winding of each of said transforming means and connected in the circuit of the associated voltage responsive device, said secondary windings being connected together for circulating currents.

8. In a polyphase system of electric distribution, a source of alternating current, a distribution circuit, a plurality of parallel feeders connecting said source to said distribution circuit, polyphase voltage modifying means associated with each feeder for controlling the voltage impressed on said distribution circuit, a voltage responsive device associated with each feeder for controlling the associated voltage modifying means, a circuit for each voltage responsive device, a line drop compensator associated with each voltage responsive device, transforming means associated with each feeder and connected so that the current therein varies with the current in the associated feeder, each transforming means comprising relatively movable primary and secondary windings, an impedance connected directly across a secondary winding of each of said transforming means and connected in the circuit of the associated voltage responsive device, said secondary windings of said transforming means being connected together for circulating currents, and switching means for short circuiting said impedances.

9. In a polyphase system of electric distribution, a source of alternating current, a distribution circuit, a plurality of parallel feeders connecting said source to said distribution circuit, polyphase voltage modifying means associated with each feeder for controlling the voltage impressed on said distribution circuit, a contact-making voltmeter associated with each feeder and connected to be responsive to the voltage thereof for controlling the associated voltage modifying means, a circuit for each voltmeter, a line drop compensator associated with each voltmeter comprising an impedance in the circuit of the associated voltmeter and a plurality of current transformers having primary windings energized in accordance with the current in the associated feeder and secondary windings connected to said impedance, transforming means comprising relatively movable primary and secondary windings associated with each feeder having said primary windings connected in the secondary circuits of the associated current transformers, secondary windings of said transforming means being connected together for circulating currents, and a second impedance connected in the circuit of each voltmeter and across said secondary windings of the transforming means which is associated with the feeder with which said voltmeter is associated.

10. In a polyphase system of electric distribution, a source of alternating current, a distribution circuit, a plurality of parallel feeders connecting said source to said distribution circuit, polyphase voltage modifying means associated with each feeder for controlling the voltage impressed on said distribution circuit, a contact-making voltmeter associated with each feeder and connected to be responsive to the voltage thereof for controlling the associated voltage modifying means, a circuit for each voltmeter, a line drop compensator associated with each voltmeter comprising an impedance in the circuit of the associated voltmeter and current transformers having primary windings energized in accordance with the current in the associated feeder and secondary windings connected to said impedance, transforming means comprising relatively movable primary and secondary windings associated with each feeder, the primary windings of each of said transforming means being connected to be energized from the secondary windings of the associated current transformers and a secondary winding of each of said transforming means being connected together for circulating currents, a second impedance connected in the circuit of each voltmeter and across a secondary winding of the transforming means which is associated with the feeder with which said voltmeter is associated, and a shortcircuiting switch associated with each of said second impedances.

11. In a polyphase system of electric distribution, a source of alternating current, a distribution circuit, a plurality of parallel feeders connecting said source to said distribution circuit, a polyphase induction regulator in each feeder having a rotatable member, actuating means for each regulator, a contact-making voltmeter associated with each actuating means for controlling the operation thereof, a circuit for each voltmeter connected so that a voltage which is proportional to the voltage of the associated feeder is impressed thereon, a line drop compensator associated with each voltmeter comprising a resistor and a reactance in the circuit of the voltmeter and current transformers energized in accordance with the current in the associated feeder, having secondary windings of two of said transformers connected so that the secondary current flows through the resistor and reactance, a phase shifter associated with each voltmeter having relatively movable primary and secondary members, polyphase primary windings arranged on one of said members and connected to be energized from the secondary windings of said current transformers, means for moving one of said members of said phase shifter in synchronism with the rotatable member of the induction regulator with which said phase shifter is associated, a second impedance in the circuit of each voltmeter connected across a secondary winding of the phase shifter associated therewith, said secondary windings of said phase shifters being connected together for circulating currents.

12. In a polyphase system of electric distribution, a source of alternating current, a distribution circuit, a plurality of feeders connecting said source and said distribution circuit, a polyphase induction regulator in each feeder having a rotatable member, actuating means for each regulator, a contact-making voltmeter associated with each actuating means for controlling the operation thereof, a circuit for each voltmeter connected so that a voltage which is proportional to the voltage of the associated feeder is impressed thereon a line drop compensator associated with each voltmeter comprising a resistor and a reactance in the circuit of the voltmeter and current transformers having primary windings energized in accordance with the current in the associated feeder and secondary windings connected so that the secondary current flows through said resistor and reactance, a phase shifter associated with each voltmeter having a fixed stator member with primary windings thereon connected to be energized from the secondary windings of said current transformers and a rotatable secondary member comprising a plurality of windings, means for effecting movement of each of said rotatable members in accordance with the movement of the rotatable member of the induction regulator which which said phase shifter is associated, a second impedance comprising a resistor and a reactance connected in the circuit of each voltmeter, one of said plurality of windings of each of said rotatable secondary members being connected across said second impedance associated therewith and each of the remaining windings being short-circuited on themselves, and switching means for short-circuiting each of said second impedances.

In witness whereof, I have hereto set my hand this twenty-first day of February, 1927.

FRANKLIN J. CHAMPLIN.